(12) United States Patent
Schödel et al.

(10) Patent No.: US 11,760,024 B2
(45) Date of Patent: Sep. 19, 2023

(54) APPARATUS FOR ADDITIVELY MANUFACTURING OF THREE-DIMENSIONAL OBJECTS

(71) Applicant: CL SCHUTZRECHTSVERWALTUNGS GMBH, Lichtenfels (DE)

(72) Inventors: Frank Schödel, Kronach (DE); Jens Stammberger, Rödental (DE)

(73) Assignee: Concept Laser GmbH, Lichtenfels (DE)

(*) Notice: Subject to any disclaimer, the term of this patent is extended or adjusted under 35 U.S.C. 154(b) by 461 days.

(21) Appl. No.: 15/987,801

(22) Filed: May 23, 2018

(65) Prior Publication Data
US 2019/0022943 A1    Jan. 24, 2019

(30) Foreign Application Priority Data
Jul. 21, 2017  (EP) ..................... 17182634

(51) Int. Cl.
*B29C 64/371*   (2017.01)
*B29C 64/171*   (2017.01)
(Continued)

(52) U.S. Cl.
CPC ............ *B29C 64/371* (2017.08); *B22F 10/28* (2021.01); *B22F 10/322* (2021.01); *B22F 12/70* (2021.01); *B22F 12/80* (2021.01); *B28B 1/001* (2013.01); *B28B 17/0081* (2013.01); *B29C 64/153* (2017.08); *B29C 64/171* (2017.08); *B29C 64/20* (2017.08); *B29C 64/268* (2017.08); *B29C 64/30* (2017.08); *B29C 64/393* (2017.08);
(Continued)

(58) Field of Classification Search
None
See application file for complete search history.

(56) References Cited

U.S. PATENT DOCUMENTS 5,658,412 A * 8/1997 Retallick ............... B29C 64/153
                                                          156/273.5
10,603,717 B2 * 3/2020 Grant .................... B22F 3/1055
(Continued)

FOREIGN PATENT DOCUMENTS

CN       104001915 A     8/2014
CN       105268971 A     1/2016
(Continued)

OTHER PUBLICATIONS

Google Patents Translation of DE 102007047326B4 (Year: 2020).*
(Continued)

*Primary Examiner* — Alison L Hindenlang
*Assistant Examiner* — Andrés E. Behrens, Jr.
(74) *Attorney, Agent, or Firm* — Dority & Manning, P.A.

(57) ABSTRACT

Apparatus (1) for additively manufacturing of three-dimensional objects by means of successive layerwise selective irradiation and consolidation of layers of a build material (13) which can be consolidated by means of an energy beam, comprising at least one module (2) moveable between at least two positions along a travel path, wherein a stream generating unit (6) is configured to create a stream of process gas (7) onto the module (2) at least partly along the travel path (5) of the module (2) between the first and the second position (3, 4).

16 Claims, 1 Drawing Sheet

(51) Int. Cl.
| | |
|---|---|
| *B29C 64/30* | (2017.01) |
| *B29C 64/268* | (2017.01) |
| *B33Y 10/00* | (2015.01) |
| *B22F 10/00* | (2021.01) |
| *B22F 12/70* | (2021.01) |
| *B22F 12/80* | (2021.01) |
| *B22F 10/322* | (2021.01) |
| *B33Y 30/00* | (2015.01) |
| *B33Y 50/02* | (2015.01) |
| *B33Y 50/00* | (2015.01) |
| *B29C 64/153* | (2017.01) |
| *B29C 64/20* | (2017.01) |
| *B29C 64/393* | (2017.01) |
| *B28B 1/00* | (2006.01) |
| *B28B 17/00* | (2006.01) |
| *B22F 10/73* | (2021.01) |
| *B22F 12/33* | (2021.01) |
| *B22F 12/50* | (2021.01) |
| *B22F 12/90* | (2021.01) |
| *B22F 10/28* | (2021.01) |

(52) U.S. Cl.
CPC .......... *B33Y 10/00* (2014.12); *B33Y 30/00* (2014.12); *B33Y 50/02* (2014.12); *B22F 10/73* (2021.01); *B22F 12/33* (2021.01); *B22F 12/50* (2021.01); *B22F 12/90* (2021.01)

(56) References Cited

U.S. PATENT DOCUMENTS

| | | | | |
|---|---|---|---|---|
| 10,682,700 | B2* | 6/2020 | Nyrhilä | B33Y 50/02 |
| 2012/0045617 | A1 | 2/2012 | Yasukochi | |
| 2015/0125333 | A1 | 5/2015 | Bruck et al. | |
| 2015/0367574 | A1* | 12/2015 | Araie | B33Y 30/00 425/174.4 |
| 2016/0136731 | A1* | 5/2016 | Mcmurtry | B29C 64/153 419/53 |
| 2017/0028472 | A1 | 2/2017 | Shaw et al. | |
| 2017/0136696 | A1* | 5/2017 | Jakimov | B22F 10/322 |
| 2017/0146382 | A1* | 5/2017 | Gold | G01F 15/14 |
| 2019/0009334 | A1* | 1/2019 | Effernelli | B29C 64/153 |
| 2019/0291184 | A1* | 9/2019 | Buller | B29C 64/364 |
| 2019/0308370 | A1* | 10/2019 | Lyckfeldt | B33Y 70/00 |
| 2020/0114425 | A1* | 4/2020 | Ott | B33Y 10/00 |
| 2021/0362238 | A1* | 11/2021 | Zeilinger | B29C 64/153 |

FOREIGN PATENT DOCUMENTS

| | | | | |
|---|---|---|---|---|
| CN | 106395408 A | | 2/2017 | |
| CN | 108656525 | * | 3/2017 | ........ B33Y 30/00 |
| DE | 102007047326 A1 | * | 4/2009 | ........ B29C 64/153 |
| DE | 102007047326 A1 | | 4/2009 | |
| JP | H07501765 A | | 2/1995 | |
| JP | 2016/006215 A | | 1/2016 | |
| JP | 2017/031505 A | | 2/2017 | |
| JP | 2018/515372 A | | 6/2018 | |
| WO | 2014039378 A1 | | 3/2014 | |
| WO | WO2017/050860 A1 | | 3/2017 | |

OTHER PUBLICATIONS

DE-102007047326-A1 (Herzog) Oct. 2007 (online machine translation), [Retrieved on Apr. 6, 2022], Retrieved from: Espacenet (Year: 2007).*
CN-108656525 (Lei) Mar. 2017 (online machine translation), [Retrieved on Mar. 31, 2023], Retrieved from: Google (Year: 2017).*
European Search Opinion Corresponding to Application No. 17182634.
European Search Report Corresponding to Application No. 17186234 dated Jan. 11, 2018.
Japanese Office Action Corresponding to Application No. 2017245351 dated Sep. 19, 2018.
Japanese Office Action Corresponding to Application No. 2017245351 dated Mar. 22, 2019.
Japanese Office Action Corresponding to Application No. 2017245351 dated Jul. 11, 2019.
Combined Chinese Search Report and Office Action Corresponding to Application No. 201711103349 dated Apr. 1, 2020.
Copy of Machine Translated Japanese Seaich Report Corresponding to Application No. 2019207948 on 18NOV2020.

* cited by examiner

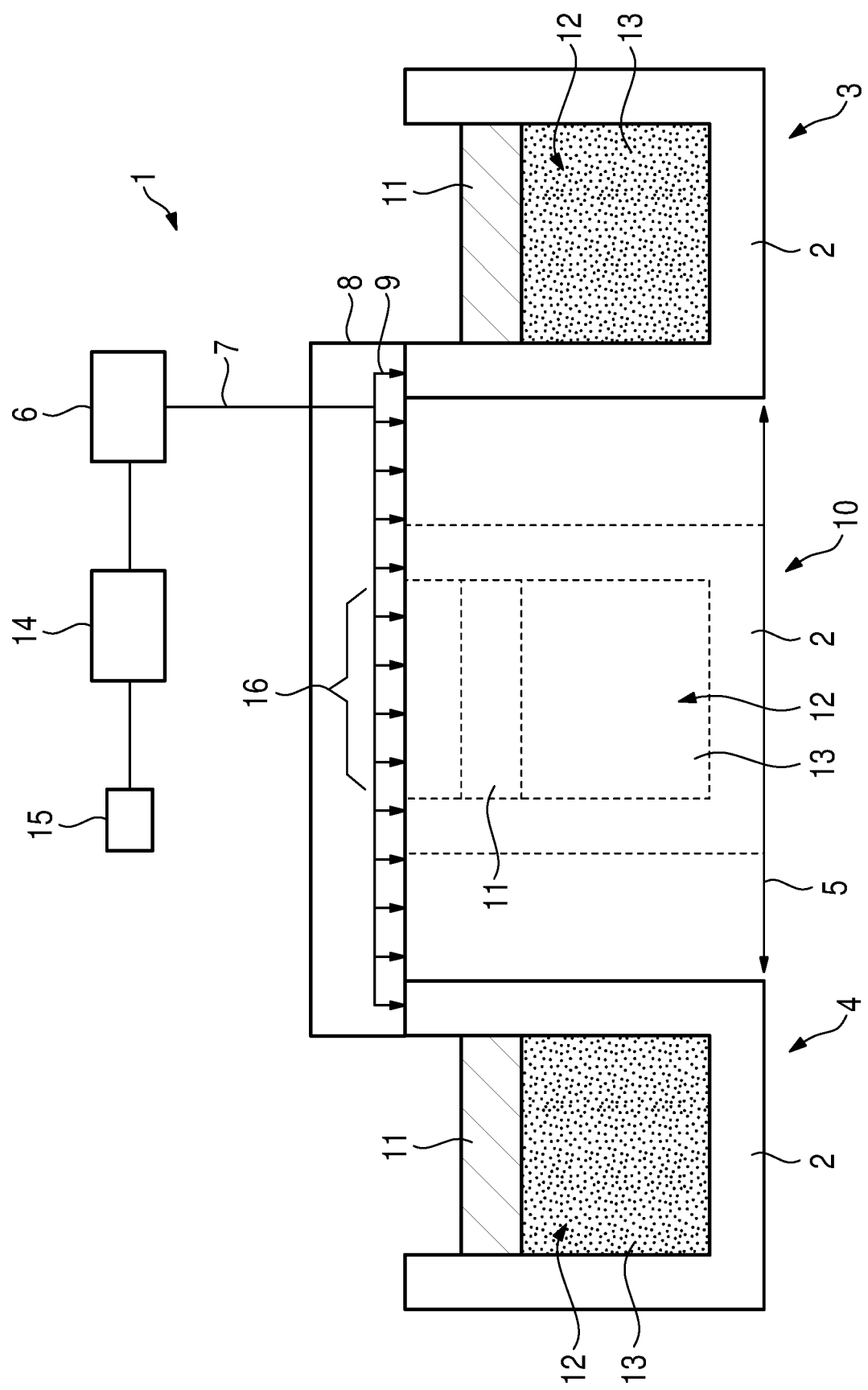

APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 182 634.0 filed Jul. 21, 2017, the contents of which are incorporated herein by reference in their entirety as if set forth verbatim.

DESCRIPTION

The invention refers to an apparatus for additively manufacturing of three-dimensional objects by means of successive layerwise selective irradiation and consolidation of layers of a build material which can be consolidated by means of an energy beam, comprising at least one module moveable between at least two positions along a travel path.

Such apparatuses are well known from prior art, wherein an energy beam is used to irradiate a defined region of the current layer of build material, thereby consolidating the material. The material is contained in at least one module that is movable between two positions along a travel path. The module can for example be built as a dose module and be movable between, for example a first position in which the module is used inside the apparatus and a second position, for example a refill station, in which the build material is refilled into the dose module. It is also possible, that the module is a build module, in which the object is built layer by layer, wherein the build module is movable between a first position inside the apparatus and a second position for example inside a handling station, in which the readily built object is unpacked. Further, it is known from prior art to use a process gas, in particular an inert gas, such as argon, to avoid the build material coming in contact with ambient air, in particular the oxygen contained in the ambient air.

To assure that the material does not come in contact with oxygen, for example while the module containing the build material is moved from one position inside the apparatus or in the plant to another position inside the apparatus or in the plant, a cover is placed on the respective module containing the build material. Besides it is possible to create a volume of process gas above the material inside the module, so that a certain volume, i.e. a "sea", of process gas is located above the build material and avoids the build material to come in contact with the ambient air.

Thus, it is possible, that the protective volume or layer of process gas located above the interior of a chamber of the module is swirled when the module is moved from the first position into the second position.

Thus, it is an object of the present invention to ensure that the build material does not come in contact with the ambient air or that an inertization of the module is improved, respectively.

The object is achieved by an apparatus according to the claims. Preferred embodiments of the invention are subject to the dependent claims.

The invention is based on the idea that a stream generating unit is used that is configured to create a stream of process gas onto the module at least partly along the travel path of the module between the first and the second position. Thus, by way of the invention, a volume or a layer of process gas located above the build material can be upheld or restored during the movement of the module along the travel path from the first position to the second position. Therefore, a contact or containment of the build material with the ambient air is avoided or prevented, respectively. Hence, the module can be moved along the travel path without the risk of swirling the layer of process gas that is located above the build material. Self-evidently, it is possible to arrange the stream generating unit in that the stream of process gas onto the module is generated merely on a part or multiple parts of the travel path or the stream of process gas can be generated continuously along the path of the module between the first and the second position.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

According to a preferred embodiment of the apparatus the module is at least partly integrated in a process chamber of the apparatus in the first position and wherein the module is outside the process chamber in the second position. Therefore, the module is at least partly integrated in a process chamber in the first position, wherein the process chamber of the apparatus is the chamber in which the manufacturing cycle or at least the main steps of a build process are executed in. For example, a build plane of a build module is located inside the process chamber, wherein the build material is irradiated on the build plane via the energy beam. Self-evidently, the process chamber is inertized, so that the module is in an inertized volume in the first position being at least partly integrated in the process chamber. Whenever the module is moved to the second position, i.e. outside the process chamber, the module leaves the inertized environment that is being upheld inside of the process chamber. Therefore, it is necessary to maintain or restore the protective layer of process gas above the build material in predefined intervals via the stream of process gas onto the module generated by the stream generating unit.

The apparatus can further be improved in that the stream generating unit is connected to a guiding structure, in particular a channel, or comprises a guiding structure configured to guide and distribute the process gas to the module along at least a part of the travel path. According to this embodiment a guiding structure is provided that covers at least part of the travel path the module is moved along on the way from the first position to the second position. The stream generating unit is connected with the guiding structure or comprises the same, wherein the stream of process gas can be guided and distributed onto the module continuously or in predefined locations along the travel path. Hence, the guiding structure is used to guide and distribute the process gas generated by the stream generating unit, wherein the process gas is guided to the module to maintain or restore the protective layer of process gas above the build material contained inside the module.

The guiding structure preferably is built as or comprises at least a wall element and/or a channel and/or a nozzle in which the process gas is guided or by which the process gas is distributed to the module. The guiding structure may comprise a wall element with a circular or triangular or any arbitrary cross-section.

It is particularly preferred that the guiding structure extends at least partly between the first and the second position, wherein the guiding structure is located above the travel path of the module. Thus, the guiding structure, in particular a channel, is located above the travel path of the module or above the module when it is moved along the travel path, respectively. The stream generating unit generates a stream of process gas that is guided or distributed via the guiding structure and therefore it is possible, to guide or distribute the stream of process gas via the guiding structure onto the module from above. Hence, the layer of process gas above the build material can be maintained or restored continuously or in predefined positions along the travel path, wherein the fresh process gas streams from the guiding structure located above the travel path of the module onto the module. Besides, it is also possible to guide the stream of process gas under a predefined angle relative to the module. For example the generation of a stream of process gas that runs parallel to the module is also feasible.

According to another preferred embodiment of the apparatus a control unit is provided that is configured to control at least one flow property, in particular an opening state of at least one gas outlet and/or a gas pressure and/or a gas flow rate and/or a gas flow velocity and/or a temperature. The control unit is preferably configured to determine at least one parameter and control of the at least one flow property dependent on the determined parameter. In varying the flow properties or at least one of the flow properties the stream of process gas onto the module can be regulated. The stream of process gas can therefore, be varied with respect to the current situation.

Hence, the control unit is configured to control an opening state of at least one outlet, for example a nozzle, located along the travel path. The stream of process gas through the gas outlet or through the guiding structure can further be varied in terms of the gas flow velocity and/or the gas flow rate and/or the gas pressure. Thereby, the control unit is configured to regulate how fast and how much gas is streaming into or onto the module maintaining or restoring the volume or layer of process gas located above the build material or inside the chamber of the module, respectively. Thus, at least one opening in the guiding structure can be at least partly opened and/or closed dependent on the need for process gas to stream onto the module.

Self-evidently, it is also possible to maintain or restore the layer of protective process gas inside the module, if the module is empty, i.e. not containing any build material. That is, if for example, the dose module is empty and is being moved to the refill station, it is still necessary to uphold or restore the inertization to allow for a step of refilling build material into the still inertized dose module.

Further, it is possible to control the temperature of the process gas that is streaming onto the module via an adequate temperature regulation by the control unit. Therefore, if a temperature difference occurs between the ambience and the build material inside the module, the material can be isolated via the protective layer of process gas located above the build material. Additionally, the build material inside the module can be tempered to a defined temperature via the stream of process gas as the temperature of the stream of process gas can be controlled by the control unit and therefore a temperature control of the build material or the built object inside the module is made possible, via a temperature exchange between the layer of process gas located above the build material or the process gas streaming onto or into the module and the build material inside the module. For example, after a build job is finished, the build module with the object inside can be moved into a handling station, wherein the built object can be cooled in a predefined way via the stream of process gas, as the control unit regulates the temperature of the stream of process gas adequately.

According to another preferred embodiment of the apparatus the control unit is configured to control at least one flow property dependent on a position of the module. This allows for a distribution and/or a guidance of the stream of process gas to the exact position in which the module is currently positioned. Thus, a plurality of gas outlets can be provided along the guiding structure, i.e. along the travel path. The control unit is configured to open and/or close each of the plurality of gas outlets dependent on the position of the module. The control unit thereby opens the correspondent gas outlets the module is located beneath, therefore creating a stream of process gas onto the module, wherein the other outlets are closed to save process gas that would be streamed to the environment around the module otherwise.

The apparatus can further be improved in that at least one sensor is configured to determine information relating to an amount of process gas in the vicinity of the module and/or inside a chamber of the module, wherein the control unit is configured to receive the sensor information and to control at least one flow property depending on the sensor information.

By way of this embodiment and amount of process gas in the vicinity of the module answers are inside a chamber of the module can be determined and sent to the control unit, wherein at least one of the flow properties can be controlled depending on the sensor information. Therefore, it can be evaluated whether or how much process gas needs to be streamed onto the module or into the chamber of the module, respectively. If the amount of process gas inside the chamber or in the vicinity of the module is high enough to assure in isolation of the build material from the ambient air the respective flow property can be reduced, wherein if the evaluation of the amount of process gas in the vicinity of the module and/or inside the chamber of the module leads into a need of process gas the respective flow property can be increased to assure the isolation of the build material from the ambient air.

Another embodiment of the apparatus suggests that a cover of the module is removed uncovering a chamber of the module in the first and/or the second position, wherein the stream generating unit is configured to create the stream of process gas at least partly into the chamber of the module.

According to this embodiment a cover of the module can be removed in the first and/or the second position. This allows for a covering of the chamber of the module for example when the module needs to travel longer distances and/or is stored in a module storage. The cover can be removed uncovering the chamber of the module and therefore a stream of process gas is needed to isolate the build material from the ambient air. The stream generating unit therefore, generates a stream of process gas at least partly into the chamber of the module to ensure that the build material cannot react with or is contaminated by the ambient air.

Further, the apparatus can be improved in that a first position is inside a dose chamber and/or a build chamber and/or an overflow chamber and wherein the second position is inside a handling station and/or a refill station and/or a filtering station and wherein the travel path runs at least partly inside a tunnel structure.

According to this embodiment the module can be a dose module and/or a move module and/or an overflow module. The overflow module is a module receiving surplus build material that is conveyed by coating the build plane of the build module. The first position can therefore, be inside a process chamber, wherein the dose module is located in that the chamber of the module functions as a dose chamber or the build module is located in the position of a build chamber or the overflow module is located in the position of an overflow chamber. Accordingly, the second position is inside a handling station and/or a refill station and/or a filtering station, wherein the corresponding module travels from the first position to the second position as needed. Self-evidently, the first position and the second position apply conversely. Hence, the first and the second position can be redefined or switched arbitrarily. Preferably, the first position and the second position are linked by a tunnel structure, wherein the stream generating unit can be partly integrated into the tunnel structure to distribute and/or guide the stream of process gas created by the stream generating unit onto the module.

According to the previous embodiment the module is a dose module and the chamber is a dose chamber containing build material or the module is a build module and the chamber is a build chamber or the module is an overflow module and the chamber is an overflow chamber. Thus, the module can be any of the modules that are used for an apparatus for manufacturing three-dimensional objects, as described before.

Besides, the invention relates to a plant comprising at least two inventive apparatuses, wherein the first position is located at least partly inside of a first apparatus and the second position is located at least partly inside a second apparatus.

Exemplary embodiments of the invention are described with reference to the Fig., whereby the sole Fig. shows a principle drawing of a side view of an apparatus for additively manufacturing three-dimensional objects according to an exemplary embodiment.

The Fig. shows an apparatus 1 for additively manufacturing of three-dimensional objects by means of successive layerwise selective irradiation and consolidation of layers of a build material which can be consolidated by means of an energy beam, comprising a module 2 that is movable between a first position 3 and a second position 4 along a travel path 5. The apparatus 1 further comprises a stream generating unit 6 configured to create a stream of process gas 7 onto the module 2 along the travel path 5 of the module 2 between the first and the second position 3, 4.

Subsequently, the first position 3 is referred to as a position wherein the module 2 is at least partly arranged inside a process chamber of the apparatus 1 (not shown). The second position 4 is referred to as a position outside the process chamber of the apparatus 1. Self-evidently, both positions can be switched in that the first position 3 is outside and the second position 4 is inside the process chamber of the apparatus 1.

The Fig. further shows that the apparatus 1 comprises a guiding structure 8 configured to guide and distribute the stream the process gas 7 to a plurality of gas outlets 9. The guiding structure 8 is located above the travel path 5 and therefore, above the module 2 when it is moved from the first position 3 to the second position 4. There is a third position 10 shown in the Fig., wherein the module 2 is depicted as a dashed shape, wherein the third position 10 is a position between the first position 3 and the second position 4.

With the module 2 in the third position 10 the module 2 is located beneath the guiding structure 8 and therefore, beneath the plurality or some of the gas outlets 9. When the module 2 leaves the inertized atmosphere of the process chamber a stream of process gas 7 is generated by the stream generating unit 6 to maintain or restore a layer 11 of process gas 7 inside a chamber 12 of the module 2. The layer 11 of process gas 7 separates the build material 13 inside the chamber 12 from the atmosphere.

The apparatus 1 further comprises a control unit 14 that is configured to control at least one flow property of the stream of process gas 7. Further, the apparatus 1 comprises a sensor 15 that is linked to the control unit 14 so that sensor information determined by the sensor 15 can be sent to or received by the control unit 14. Therefore, the control unit 14 is configured to control the flow rate of the stream of process gas 7 as well as a streaming velocity. Dependent on the sensor information of the sensor 15 the control unit 14 can regulate the amount of process gas 7 streamed onto the module 2 in the third position 10. The third position 10 is of course only exemplary and can be any position, wherein the module 2 is at least partly beneath the guiding structure 8. The sensor information may therefore, contain information regarding the amount of process gas 7 inside the chamber 12 or inside the vicinity of the module 2. Thus, the control unit 14 can regulate the flow properties of the stream of process gas 7 so that the layer 11 of protective process gas 7 can be upheld or restored to ensure that the build material 13 does not come in contact with the ambient air.

Additionally, the control unit 14 can control the opening state of the gas outlets 9 dependent on the current location of the module 2. Therefore, only those gas outlets 9 that are above the module 2 in the third position 10 can be opened to save process gas 7, for example argon. In the situation depicted in the Fig. only the group of gas outlets 16 is opened that is located above the chamber 12, wherein the other gas outlets 9 are closed. As the module 2 proceeds along the travel path 5 the opening state of the neighboring gas outlets 9 are adopted accordingly, to ensure that only the gas outlets 9 above the module 2 are opened to replenish the process gas 7 in the layer 11.

The control unit 14 further is configured to control the temperature of the stream of process gas 7 via adequate heating and/or a cooling means. Therefore, the build material 13 or, for example a built object inside the chamber 12, can be tempered accordingly.

The invention claimed is:

1. An apparatus for additively manufacturing three-dimensional objects by successive layerwise selective irradiation and consolidation of layers of a build material with an energy beam, the apparatus comprising:
   a process chamber;
   at least one module moveable between a first position and a second position along a travel path, the at least one module comprising a powder chamber;

a stream generating unit configured to generate a stream of process gas onto the at least one module at least partly along the travel path of the at least one module between the first position and the second position, wherein the at least one module is located at least partly inside the process chamber in the first position and is located outside the process chamber in the second position;

a guiding structure arranged above the travel path, the guiding structure extending from the first position to the second position, the guiding structure configured to guide the process gas along the travel path and to distribute the process gas to the powder chamber of the at least one module during movement of the at least one module along the travel path from the first position to the second position, wherein the process gas is distributed to the powder chamber via a plurality of gas outlets arranged along the guiding structure from the first position to the second position; and a control unit for controlling opening and closing of the plurality of gas outlets dependent on a current location of the at least one module, wherein only gas outlets of the plurality of gas outlets above the current location of the at least one module are opened by the control unit, and gas outlets of the plurality of gas outlets not above the current location of the at least one module are closed by the control unit to ensure that only the gas outlets above the current location of the at least one module are opened to replenish the process gas in a layer of the process gas inside the powder chamber of the at least one module.

2. The apparatus according to claim 1, wherein the at least one module comprises a dose module.

3. The apparatus according to claim 1, wherein the stream generating unit comprises the guiding structure.

4. The apparatus according to claim 1, wherein the guiding structure comprises a channel.

5. The apparatus according to claim 1, wherein each of the plurality of gas outlets is configured as a nozzle.

6. The apparatus according to claim 1, wherein the guiding structure distributes the process gas onto the powder chamber of the at least one module continuously or at predefined locations along the travel path.

7. The apparatus according to claim 1, wherein the control unit is configured to control at least one flow property from gas outlets of the plurality of gas outlets above the current location of the at least one module.

8. The apparatus according to claim 7, wherein the at least one flow property comprises at least one of:
a gas pressure;
a gas flow rate;
a gas flow velocity; or
a temperature.

9. The apparatus according to claim 7, further comprising at least one sensor, wherein the control unit is configured to control the at least one flow property dependent on sensor information from the at least one sensor.

10. The apparatus according to claim 7, further comprising at least one sensor configured to determine sensor information relating to an amount of process gas in the vicinity of the module and/or inside the powder chamber of the at least one module, wherein the control unit is configured to receive the sensor information and to control the at least one flow property depending on the sensor information.

11. The apparatus according to claim 1, further comprising a cover of the at least one module, wherein the cover is removable and configured to cover the powder chamber of the at least one module in the first and/or the second position, and wherein the stream generating unit is configured to create the stream of process gas at least partly into the powder chamber of the at least one module.

12. The apparatus according to claim 1, wherein in the second position the at least one module is located at least partly inside at least one of:
a handling station;
a refill station; or
a filtering station.

13. The apparatus according to claim 12, wherein the travel path runs at least partly inside a tunnel structure.

14. The apparatus according to claim 1, wherein the at least one module comprises a build module.

15. The apparatus according to claim 1, wherein the at least one module comprises an overflow module.

16. A plant for additively manufacturing three-dimensional objects by successive layerwise selective irradiation and consolidation of layers of a build material with an energy beam, the plant comprising:
a first apparatus;
a second apparatus;
at least one module moveable between a first position and a second position along a travel path;
a stream generating unit configured to generate a stream of process gas onto the at least one module at least partly along the travel path between the first position and the second position, wherein the at least one module is located at least partly inside the first apparatus in the first position and is located at least partly inside the second apparatus in the second position;
a guiding structure above the travel path, the guiding structure extending from the first position to the second position, the guiding structure configured to guide the process gas along the travel path and to distribute the process gas to a chamber of the at least one module during movement of the at least one module along the travel path, wherein the process gas is distributed to the powder chamber via a plurality of gas outlets arranged along the guiding structure from the first position to the second position; and
a control unit for controlling opening and closing of the plurality of gas outlets dependent on a current location of the at least one module, wherein only gas outlets of the plurality of gas outlets above the current location of the at least one module are opened by the control unit, and gas outlets of the plurality of gas outlets not above the current location of the at least one module are closed by the control unit to ensure that only the gas outlets above the current location of the at least one module are opened to replenish the process gas in a layer of the process gas inside the powder chamber of the at least one module.

* * * * *